United States Patent [19]

Conciatori et al.

[11] 4,030,933

[45] June 21, 1977

[54] PHOSPHORUS AND HALOGEN CONTAINING POLYMERS OF BIS-HYDROXYETHYL TEREPHTHALATE AS FLAME RETARDANT ADDITIVES

[75] Inventors: Anthony B. Conciatori, Chatham; Robert W. Stackman, Morristown, both of N.J.

[73] Assignee: Celanese Corporation, New York, N.Y.

[22] Filed: Apr. 7, 1975

[21] Appl. No.: 566,005

[52] U.S. Cl. .................. 106/15 FP; 106/177; 106/190; 252/8.1; 260/930; 260/973
[51] Int. Cl.² .................................. C09K 3/28
[58] Field of Search ............ 106/15 FP, 177, 190; 260/45.7 P, 928, 973, 75 P, 75 H, 930; 252/8.1

[56] References Cited

UNITED STATES PATENTS

| 3,058,935 | 10/1962 | Starck et al. | 260/75 H |
| 3,652,647 | 3/1972 | Zey | 260/474 |
| 3,706,821 | 12/1972 | Anderson | 106/177 |

FOREIGN PATENTS OR APPLICATIONS

| 1,171,617 | 6/1964 | Germany | 260/75 P |

Primary Examiner—Lorenzo B. Hayes

[57] ABSTRACT

The present invention provides a process for preparing phosphorus and halogen containing polymers useful as flame retardant additives in cellulose acetate or cellulose triacetate fibers or films. The phosphorus and halogen containing polymers may be prepared by reacting a halogenated derivative of bis-hydroxyethyl terephthalate with a halogen containing phosphorus monomer having the formula

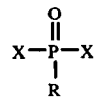

wherein R represents a radical selected from the group consisting of (a) alkyl, (b) bromoalkyl, (c) chloroalkyl, (d) alkylamido and (e) dialkylamido radicals, wherein the alkyl substituents of the foregoing may contain from 1 to 10 carbon atoms, (f) cyclohexyl, (g) phenyl, (h) benzyl, (i) tolyl, and (j) xylyl, and X represents a halogen atom (preferably chlorine or bromine). Cellulose acetate and cellulose triacetate fibers and films containing as little as two percent by weight of the polymeric flame retardant additives are rendered both non-burning and resistant to loss of the polymeric flame retardant additive during use.

18 Claims, No Drawings

PHOSPHORUS AND HALOGEN CONTAINING POLYMERS OF BIS-HYDROXYETHYL TEREPHTHALATE AS FLAME RETARDANT ADDITIVES

BACKGROUND OF THE INVENTION

1. Field of the Invention

This invention relates to a process for preparing novel polymeric flame retardant additives, the resulting polymeric flame retardant additives themselves, and non-burning fibers or films containing these flame retardant additives.

2. Summary of the Prior Art

As in well known, cellulose acetate and cellulose triacetate enjoy widespread commercial acceptance for the production of oriented shaped articles such as fibers or films. However, these acetates are flammable, i.e., they not only burn upon application of a flame, but they lack self-extinguishing characteristics. This flammability propensity renders these acetates unsuitable for the production of fibers and films intended for utilization in fire-critical areas, e.g., such end-uses as children's clothing and sleepwear, and carpets, sheets, and draperies in hospitals, nursing homes, etc.

Although the prior art contains some examples of non-burning cellulose acetate and cellulose triacetate compositions, many are not commercially acceptable. For example, it is known to use non-polymeric flame retardant compounds such as tris(2,3-dibromopropyl)-phosphate, bis(2-chloroethyl)-2-chloroethylphosphonate, octabromobiphenyl, and hexabromobenzene either alone or in combination with other flame retardant additives to make materials such as fibers and films less flammable. However, the use of such non-polymeric flame retardant compounds in fibers and films may be disadvantageous in that the relatively small size of the non-polymeric molecules makes them susceptible to removal from the fibers or films. For example, exudation of these non-polymeric additives may occur—especially at elevated temperatures. The additive may become visually apparent upon the surface of the fibers or film as a fine powder. Also, non-polymeric flame retardant additives may be removed from the fibers or film by washing or dry cleaning.

It is also known to use polymeric compounds as flame retardant additives for certain film forming materials. For example, U.S. Pat. No. 2,636,876 discloses phosphorus and chlorine containing polymers which have a flame-retardant effect on nitrocellulose.

The search has continued for improved polymeric additives which possess flame retardant characteristics and which are non-exuding from cellulose acetate and cellulose triacetate fibers and films.

OBJECTS AND SUMMARY OF THE INVENTION

Accordingly, a general object of the present invention is to avoid or substantially alleviate the above problems of the prior art.

A more specific object of the present invention is to provide a process for preparing flame retardant additives for cellulose acetate and cellulose triacetate fibers and films and the flame retardant additives themselves.

Another object of the present invention is to provide non-burning cellulose acetate and cellulose triacetate fiber and film compositions which include in intimate admixture therewith a flame retardant additive which is substantially non-exuding from the resulting fiber or film even at elevated temperatures.

Other objects and advantages of the present invention will become apparent from the following summary and description of the preferred embodiments of the present invention.

In one aspect, the present invention provides a process for preparing phosphorus and halogen containing polymers useful as flame retardant additives. This process comprises reacting a halogenated derivative of bis-hydroxyethyl terephthalate with a halogen containing phosphorus monomer having the formula

wherein R represents a radical selected from the group consisting of (a) alkyl, (b) bromoalkyl, (c) chloroalkyl, (d) alkylamido and (e) dialkylamido radicals, wherein the alkyl substituents of the foregoing may contain from 1 to 10 carbon atoms, (f) cyclohexyl, (g) phenyl, (h) benzyl, (i) tolyl and (j) xylyl, and X represents a halogen atom.

In another aspect, the present invention provides the phosphorus and halogen containing polymers having the formula

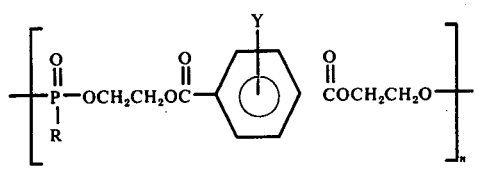

wherein the Y attached to the aromatic ring represents 1 to 4 halogen atoms; the R represents a radical selected from the group consisting of (a) alkyl, (b) bromoalkyl, (c) chloroalkyl, (d) alkylamido and (e) dialkylamido radicals, wherein the alkyl constituents of the foregoing may contain from 1 to 10 carbon atoms, (f) cyclohexyl, (g) phenyl, (h) benzyl, (i) tolyl and (j) xylyl; and n is an integer greater than 1.

In still another aspect, there are provided non-burning cellulose acetate and cellulose triacetate fiber and film compositions which include in intimate admixture therewith flame retardant additives which are non-exuding from the resulting fibers and films.

The essence of the present invention is the discovery that the particular polymeric additives produced in the process of the present invention not only possess greater flame retardant characteristics than other polymeric materials (e.g., the non-halogenated bis-hydroxyethyl terephthalate phosphonate polymer), but also are more durable than non-polymer additives (such as hexabromobenzene or octabromobiphenyl) which admittedly possess flame retardant characteristics, but are not durable since they are susceptible to exudation from the fibers and film.

DESCRIPTION OF THE PREFERRED EMBODIMENTS

As indicated above, the phosphorus and halogen containing polymers of the present invention may be prepared by reacting a halogenated derivative of bishydroxyethyl terephthalate with a halogen containing phosphorus monomer having the formula

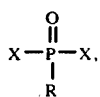

wherein R represents a radical selected from the group consisting of (a) alkyl, (b) bromoalkyl, (c) chloroalkyl, (d) alkylamido and (e) dialkylamido radicals, wherein the alkyl substituents of the foregoing may contain from 1 to 10 carbon atoms, (f) cyclohexyl, (g) phenyl, (h) benzyl, (i) tolyl and (j) xylyl, and X represents a halogen atom. This reaction may be represented as follows:

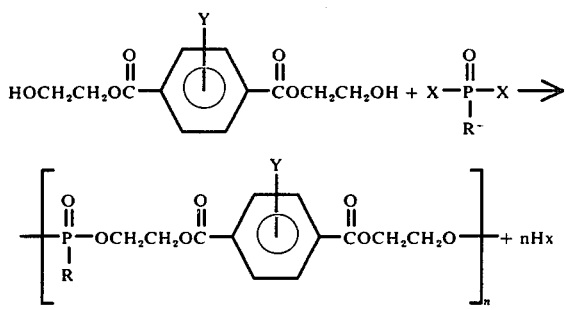

wherein the Y attached to the aromatic ring represents 1 to 4 halogen atoms such as chlorine, bromine, or mixtures thereof; the X's on the phosphorus monomer represent halogen atoms such as chlorine, bromine or mixtures thereof; the R radical has the definition given above; and $n$ is an integer greater than 1, e.g., typically from about 3 to about 50, and preferably from about 5 to about 10.

The halogenated derivatives of bis-hydroxyethyl terephthalate may be prepared in accordance with the procedures set forth in U.S. Pat. No. 3,652,647, which is assigned to the assignee of the present invention and which is herein incorporated by reference. This process comprises reacting halo-substituted terephthalatic acid with an alkylene oxide such as ethylene oxide at temperatures of from about 100° to about 200° C in the presence of a finely divided carbon catalyst.

Any halo-substituted terephthalic acid may be used to prepare the halogenated derivatives of bis-hydroxyethyl terephthalate, although chloro- and bromo-substituted terephthalic acids such as dichloro-, dibromo-, and tetrachloro terephthalic acids are preferred. Tetrachloro terephthalic acid is particularly preferred for preparing the halogenated derivatives of bis-hydroxyethyl terephthalate.

Mixtures of halogenated derivatives of bis-hydroxyethyl terephthalate may also be used.

As indicated hereinabove, the halogen-containing phosphorus monomers may be of the general formula

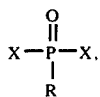

wherein X represents a halogen atom such as chlorine or bromine and R represents a radical selected from the group consisting of (a) alkyl, (b) bromoalkyl, (c) chloroalkyl, (d) alkylamido and (e) dialkylamido radicals, wherein the alkyl substituents of the foregoing may contain from 1 to 10 carbon atoms, (f) cyclohexyl, (g) phenyl, (h) benzyl, (i) tolyl and (j) xylyl. Typical halogen containing phosphorus monomers include 2-ethylhexyl phosphonyl dichloride, 3,3-dimethyl pentyl phosphonyl dichloride, phenyl phosphonyl dichloride, cyclohexyl phosphonyl dichloride, benzyl phosphonyl dichloride, p-tolyl phosphonyl dichloride, methyl phosphonyl dichloride, chloromethyl phosphonyl dichloride and decyl phosphonyl dichloride. The R radical is preferably phenyl or chloromethyl and X is preferably chlorine.

The halogenated derivatives of bis-hydroxyethyl terephthalate and the halogen-containing phosphorus monomers may be reacted in any molar ratio although a molar ratio of the halogenated derivatives of bis-hydroxyethyl terephthalate to the halogen containing phosphorus monomers of generally from about 0.33 to 1 to about 3 to 1, typically from about 0.66 to 1 to about 1.5 to 1, and preferably from about 0.90 to 1 to about 1.1 to 1 may be employed.

The monomers may be reacted together in solution in the presence of a solvent which will dissolve each and which is compatible with each. Such solvents include benzene, pyridine, methylene chloride, dichloroethane, tetrahydrofuran, dioxane and mixtures thereof, such as a mixture of benzene and pyridine. Benzene, pyridine, and mixtures thereof are preferred solvents.

Basic solvents such as pyridine are particularly preferred. When such a basic solvent is not used, however, then an acid acceptor such as a tertiary amine must be used in a molar ratio of at least two moles of tertiary amine per mole of halogen containing phosphorus monomer. Typical tertiary amines include triethyl amine, tributyl amine, pyridine, and litidine. The basic solvent or the tertiary amine acid acceptor is used to remove the hydrogen halide which is produced along with the desired phosphorus and halogen containing polymer in the process of the present invention. The hydrogen halide and the basic solvent (and/or tertiary amine acid acceptor) react to form salts which may be removed using conventional techniques. For example, if a tertiary amine such as triethyl amine is used, triethyl ammonium halide salt is formed through reaction with hydrogen halide. This salt may be removed from the reaction mixture by extraction with dilute (i.e., from about 0.5 to about 5 percent by weight) aqueous hydrochloric acid, followed by water extractions.

Combinations of a basic solvent and an acid acceptor may also be used.

Sufficient solvent should be present so as to dissolve both monomers (i.e., the halogenated derivative of bishydroxyethyl terephthalate and the halogen containing phosphorus monomer). Thus, the reactant/solvent mixture may contain generally from about 2 to about 50, typically from about 5 to about 40, and preferably from about 8 to about 25 percent by weight reactants and correspondingly generally from about 50 to about 98, typically from about 60 to about 95, and preferably from about 75 to about 92 percent by weight solvent based upon the total weight of the reactants plus solvent.

The polymerization temperature must be high enough so that the solvent does not solidify and so that the polymerization reaction takes place at a practical rate, yet low enough so as to avoid decomposing the reactants or volatilizing the solvent. The polymerization temperature may generally be from about −40 to about 200, typically from about 0 to about 100, and preferably from about 15° to about 65° C.

The reaction may be conducted at any convenient pressure — i.e., subatmospheric, atmospheric, or superatmospheric pressure. The pressure may be generally from about 0.01 to about 100, typically from about 0.1 to about 10, and preferably from about 0.8 to about 1.2 atmospheres.

Although reaction time is dependent upon the concentration of the reactants and the reaction temperature, the reaction time for the formation of the flame retardant additives of the present invention may be generally from about 0.08 to about 5, typically from about 0.25 to about 4, and preferably from about 0.5 to about 3 hours.

The presence of oxygen gas in the reaction mixture generally does not lead to deleterious results but the presence of water tends to have a harmful effect because the water may hydrolyze the halogen containing phosphorus monomer to a phosphorus containing acid which may not react with the halogenated derivative of bis-hydroxyethyl terephthalate. For example, water may react with phenyl phosphonyl dichloride to produce phenyl phosphonic acid and hydrochloric acid. The use of an inert gas (such as nitrogen, argon, carbon dioxide, or the like) purge either throughout the reaction vessel or by bubbling the inert gas through the reaction mixture itself tends to prevent the reactants from contacting moisture.

As indicated hereinabove, the hydrogen halide is converted during the course of the reaction to a quaternary ammonium halide salt through reaction with either a basic solvent (e.g., pyridine) or a tertiary amine acid acceptor (e.g., triethylamine). These salts, as will as any excess tertiary amine acid acceptor which may be present, may be removed from the reaction mixture at the end of the polymerization reaction by extraction with dilute aqueous hydrochloric acid (i.e., from about 0.5 to about 5 percent by weight), followed by thorough extraction with water.

Filtration of the reaction mixture prior to extraction may remove most of the quaternary ammonium halide salt if the solubility of this salt in the particular polymerization solvent is sufficiently low. Benzene is an example of a solvent wherein the quaternary ammonium halide salt may be sufficiently insoluble as to be susceptible to removal by filtration prior to extraction.

The polymeric products may be white, glassy solids. These compounds may have a melting point of generally from about 0° to about 200°, typically from about 20° to about 170°, and preferably from about 25° to about 140° C. Furthermore, the polymeric product may be readily soluble in solvents such as acetone, methylene chloride, benzene, xylene, dichloroethane, tetrahydrofuran and mixtures of the foregoing such as acetone/benzene, 95/5 (percent by weight) acetone/water mixture and 91/9 (percent by weight) methylene chloride/methanol mixture.

The polymeric flame retardant additives of the present invention have an intrinsic viscosity, i.e., I.V., of generally from about 0.05 to about 1.0, typically from about 0.1 to about 0.6, and preferably from about 0.2 to about 0.5. The I.V. of these additives may be conveniently determined according to the following equation:

$$I.V. = \lim_{C \to 0} \frac{\ln \eta r}{C}$$

where $\eta r$ is the "relative viscosity" obtained by dividing the viscosity of a dilute solution of the polymer by the viscosity of the solvent employed (measured at the same temperature), and C is the polymer concentration in the solution expressed in grams/100 ml.

The polymeric products have weight average molecular weights of generally from about 400 to about 40,000 typically from about 500 to about 20,000 and preferably from about 1,000 to about 10,000. These polymers contain generally from about 8 to about 60, typically from about 10 to about 40, and preferably from about 20 to about 35 percent by weight halogen and generally from about 3 to about 10, typically from about 4 to about 9, and preferably from about 4.5 to about 8 percent by weight phosphorus based upon the weight of the polymer.

The polymeric product is produced in a substantially quantitative (i.e. 100%) yield. However, because of minor losses which may take place during washing and other purification procedures, the yield is frequently less than 100% depending upon the particular purification procedures and the care used in carrying out such procedures. In the present process, the yield resulting from such purification processes may be generally greater than about 85, typically greater than about 90 and preferably greater than about 92 percent based upon the reactant which initially has the smaller number of moles.

These polymeric products may be intimately admixed with cellulose acetate or cellulose triacetate so as to produce cellulose acetate or cellulose triacetate fibers or films, and in each case, the polymeric additive acts as a flame retardant when used in amounts of generally from about 2 to about 40, typically from about 4 to about 20, and preferably from about 5 to about 15 percent by weight of the total composition. The cellulose acetate or cellulose triacetate is correspondingly present in an amount of generally from about 60 to about 98, typically from about 80 to about 96, and preferably from about 85 to about 95 percent by weight of the total composition. Thus, the cellulose acetate and cellulose triacetate fibers and films are rendered non-burning when treated with these polymeric additives.

The term "non-burning" as used herein means the ability of a composition or shaped article or product made therefrom to self-extinguish upon removal of the flame source, in air. The phosphorus and halogen containing polymers produced by the process of the present invention as well as the cellulose acetate and cellulose triacetate fibers and films to which these additives may be added are non-burning. For example, although cellulose acetate or cellulose triacetate films (e.g., ½ inch × 6 inch) which are in a vertical position, will completely consume within seconds after being ignited by a match, it has been found that when the polymeric additives of the present invention are used in as little as two percent by weight of such films, these films self extinguish when the match is removed and these films are not completely consumed. Thus, the phosphorus and halogen containing polymeric additives of the present invention have rendered these films non-burning.

Films may be produced by dissolving the polymeric product in the solvents described above and then spreading the viscous polymeric solution onto a glass plate with a doctor knife and allowing the solvent to evaporate. The dried film may then be stripped from the plate.

Fibers may be produced by dissolving the polymeric product in the solvents described above and then extruding the viscous polymeric solution through a spinnerette with holes of less than about 100 micron size into an atmosphere which allows the evaporation of the solvent from the filaments. The dried filaments may then be wrapped onto a bobbin.

It has also been found that these polymeric additives are more durable, i.e., remain within the fiber or film longer than non-polymeric additives such as hexabromobenzene. Thus, these polymeric additives tend to resist exudation and/or "washing out" for longer periods than do non-polymeric additives.

This durability characteristic results from the ability of the polymeric molecule to become entangled with the molecules of the cellulose acetate or cellulose triacetate film or fiber. Non-polymeric additives cannot become so entangled due to the comparatively small size of the non-polymeric molecule.

The durability of the flame retardant additives of the present invention may be measured by washing the fibers or films containing these compounds in water at 50° C for 15 minutes each. The polymeric flame retardant additives of the present invention are not substantially removed from such fibers or films generally after 10, typically after 25, and preferably after 50 such washings.

The present invention is further illustrated by the following examples. All parts and percentages in the examples as well as in the specification and claims are by weight unless otherwise specified.

EXAMPLE I

This example illustrates the preparation of the flame retardant polymeric additives of the present invention by reacting tetrachloro bis-hydroxyethyl terephthalate with phenyl phosphonyl dichloride.

The tetrachloro bis-hydroxyethyl terephthalate used in forming the polymeric flame retardant additive may be prepared as follows:

Twenty grams of finely divided (passes through 325 mesh U.S.) animal bone carbon catalyst are added to 275 grams of tetrachloro terephthalic acid, 100 grams of ethylene oxide and 2 liters of chlorobenzene solvent in a 2.5 liter autoclave fitted with a steam jacket and mechanical stirrer. The autoclave is then sealed and heated with stirring to 160° C for about 2 hours after which the contents of the autoclave are flushed to remove ethylene oxide. The remaining slurry is filtered hot to remove the unreacted tetrachloro terephthalic acid and the carbon catalyst, and finally the tetrachloro bis-hydroxyethyl terephthalate is recovered by cooling the mother liquor to about 25° C so as to effect crystallization of the diester from solution.

Sixty percent of the tetrachloro terephthalic acid charged to the reactor is converted to tetrachloro bis-hydroxyethyl terephthalate, having a melting point of 197° to 200° C.

Gel permeation chromatography of the product shows that only monomeric material is present. An NMR spectrum exhibits absorptions at δ4.12 (m) (corresponding to a —C$\underline{H}_2$OH) and δ4.75 (m) (corresponding to

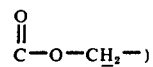

Nineteen and six-tenths grams (0.05 moles) of the tetrachloro bis-hydroxyethyl terephthalate prepared above, 100 milliliters of benzene, 8 grams of pyridine, and 12 grams of triethylamine are then added to a 250 milliliter, three-neck, round bottom flask provided with a stirrer, condenser, nitrogen inlet, and dropping funnel. To this mixture there is added dropwise from the dropping funnel a solution comprising 9.75 grams (0.05 moles) of phenyl phosphonyl dichloride dissolved in 25 milliliters of benzene.

This mixture is allowed to reflux for three hours after the addition of all of the phenyl phosphonyl dichloride. Then, the mixture is cooled to room temperature and filtered through a 25 centimeter Buchner funnel using Whatman No. 1 filter paper. The filtrate is then evaporated to dryness and about 24 grams (93 percent yield, based on phenyl phosphonyl dichloride) of product are obtained. A minor amount of pyridine hydrochloride is also present.

The product is a pale cream colored solid having an intrinsic viscosity of 0.30, a weight average molecular weight of about 10,000, and a melting point of about 50° C.

The polymeric product contains 6 percent by weight phosphorus and 27 percent by weight chlorine based upon the weight of the polymer.

EXAMPLE II

This example illustrates the preparation of the flame retardant polymeric additives of the present invention by reacting 2,5-dibromo bis-hydroxyethyl terephthalate with phenyl phosphonyl dichloride.

One hundred and six grams (1.0 mole) of p-xylene is added to a 500 milliliter flask equipped with mechanical stirrer, dropping funnel and thermometer. The flask is shielded from light and 10.05 grams of iron filings are added and then 320 grams of liquid bromine are continuously added through the dropping funnel to the stirred solution over a period of two hours. After the addition of all the bromine, the 2,5-dibromo derivative is separated from the monobromo derivative by distillation, and the 2,5-dibromo derivative is oxidized by adding to the 2,5-dibromo derivative 1,000 grams of glacial acetic acid, 0.1 grams of cobaltous acetate, and 0.1 grams of methyl ethyl ketone, and then bubbling oxygen through this solution.

The solution is cooled to 15° C and the 2,5-dibromo terephthalic acid is recovered by filtration. The acid is dried in a vacuum oven overnight.

The 2,5-dibromo terephthalic acid, 1,000 milliliters of benzene and 0.2 grams of charcoal are placed in an autoclave and 84 grams of ethylene oxide are added. The autoclave is sealed and stirred at 150° C for four hours. At the end of this period, the autoclave is opened and the cold solution filtered. The product is in the filter cake and is purified by recrystallization from xylene and dried under reduced pressure.

The purified 2,5-dibromo bis-hydroxyethyl terephthalate is produced in a yield of about 85 percent and is a white solid having a melting point of 84° to 86° C.

Twenty and six-tenths grams (0.05 moles) of the 2,5-dibromo bis-hydroxyethyl terephthalate prepared above, 100 milliliters of benzene, 22 grams of triethylamine, and 9.75 grams (0.05 moles) of phenyl phosphonyl dichloride (dissolved in 25 milliliters of benzene) are reacted as in Example I except that at the end of the reaction time, the mixture is cooled and extracted four times with 250 milliliter portions of distilled water. The organic layer is separated, dried over Drierite anhydrous calcium sulfate (having a highly porous granular structure and a high affinity for water), filtered, and evaporated to dryness.

The product is a pale yellow cream colored solid having an intrinsic viscosity of 0.42, a weight average molecular weight of 10,000, a melting point of 136° C, and is obtained in a 94 percent yield based on phenyl phosphonyl dichloride.

The polymeric product contains 4.7 percent by weight phosphorus and 35 percent by weight chlorine based upon the weight of the polymer.

EXAMPLE III

This example illustrates the preparation of a flame retardant cellulose acetate film containing 5 percent by weight of the polymeric flame retardant additive prepared in Example I.

Five grams of the polymeric flame retardant additive prepared in Example I are admixed with 650 milliliters of acetone. The solid readily dissolves. Then 95 grams of cellulose acetate are added to this solution and the mixture is stirred for 24 hours until the solution is clear and uniform. The viscous solution is then filtered through a fine porosity sintered glass funnel under pressure to give a clear polymer dope.

A portion of this solution is then poured onto a glass plate and spread with a doctor knife to a thickness of 15 mils. Upon drying, the film measures approximately three mils and is clear and transparent.

This film containing the polymeric additive prepared in Example I is subjected to the following flammability test:

A strip of the film two inches wide and ten inches long is rolled into a cylinder ten inches long, having a 1/16 inch diameter. The flame of a match is applied to the bottom of a vertically held cylinder for three seconds and then removed. The sample extinguishes within two seconds after the removal of the flame.

The polymeric flame retardant additive also does not wash out of the film after 50 washings in water at 50° C for 15 minutes each.

EXAMPLE IV

This example illustrates the preparation of a flame retardant cellulose acetate fiber containing 5 percent by weight of the polymeric flame retardant additive prepared in Example I.

Five grams of the polymeric flame retardant additive prepared in Example I are admixed with 540 milliliters of acetone. The solid readily dissolves. Then 95 grams of cellulose acetate are dissolved in this solution and the resulting solution is spun according to conventional procedures.

This fiber containing the polymeric additive prepared in Example I is subjected to the following flammability test:

The fiber is knit into a hoseleg. Various hoseleg samples are subjected to the conditions outlined in DOC FF 3-71 (Childrens Sleepware Flammability Test). The average char length of 10 of the samples is three inches with an after flame time of 4 seconds. No failures are noted for flaming drops. All of the tested samples pass the test and are found to be non-burning.

The polymeric flame retardant additive also does not wash out of the fibers after 50 washings in water at 50° C for 15 minutes each.

COMPARATIVE EXAMPLE

This comparative example illustrates the preparation of cellulose acetate films containing respectively (a) no flame retardant additive, (b) 5% of bis-hydroxyethyl terephthalate phosphonate polymer (i.e., the non-halogenated polymer), and (c) 10% hexabromobenzene.

The cellulose acetate films are prepared as in Example III above. The flammability and durability values of the films formed in this comparative example are indicated in Table I below:

Table I

| Run No. | Additive | Flammability* | Durability** |
|---------|----------|---------------|--------------|
| A | none | BEL*** | — |
| B | 5% P-BHET polymer | 7" char length<br>15 second burn time | does not wash out after 20 washings |
| C | 10% hexabromo-benzene | non-burning | washes out after 10 washings |

*The flammability test is run before the first washing.
**The durability test is the same as used in Example III.
***Burns entire length.

Thus it may be seen from a comparison of Example III and the results summarized in Table I of the Comparative Example, that the polymeric additive produced by the process of the present invention possesses both improved flammability and improved durability characteristics and is thus useful as a flame retardant additive for cellulose acetate fibers or films.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the scope of the invention.

We claim:

1. A process for preparing phosphorus and halogen containing polymers useful as flame retardant additives which process comprises reacting a halogenated derivative of bis-hydroxyethyl terephthalate with a halogen containing phosphorus monomer having the formula

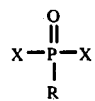

wherein R represents a radical selected from the group consisting of (a) alkyl, (b) bromoalkyl, (c) chloroalkyl, (d) alkylamido and (e) dialkylamido radicals, wherein the alkyl substituents of the foregoing may contain from 1 to 10 carbon atoms, (f) cyclohexyl, (g) phenyl, (h) benzyl, (i) tolyl and (j) xylyl, and X represents a halogen atom wherein said reaction is carried out in a molar ratio of halogenated derivative of bis-hydroxyethyl terephthalate to halogen containing phosphorus monomer of from about 0.33 to 1 to about 3 to 1, and at a temperature of from about −40° to about 200° C. and a pressure of from about 0.01 to about 100 atmospheres.

2. The process of claim 1 wherein said halogenated derivative of bis-hydroxyethyl terephthalate is selected from the group consisting of tetrachloro bis-hydroxyethyl terephthalate, dichloro bishydroxyethyl terephthalate, dibromo bis-hydroxyethyl terephthalate, and mixtures thereof.

3. The process of claim 1 wherein said reaction is carried out in the presence of a basic solvent.

4. The process of claim 1 wherein said reaction is carried out in the presence of a solvent and at least two moles of an acid acceptor for every mole of halogen containing phosphorus monomer.

5. A process for preparing phosphorus and halogen containing polymers useful as flame retardant additives which comprises reacting a halogenated derivative of bishydroxyethyl terephthalate with a halogen containing phosphorus monomer having the formula

wherein R represents a radical selected from the group consisting of (a) alkyl, (b) bromoalkyl, (c) chloroalkyl, (d) alkylamido and (e) dialkylamido radicals wherein the alkyl substituents of the foregoing may contain from 1 to 10 carbon atoms, (f) cyclohexyl, (g) phenyl, (h) benzyl, (i) tolyl and (j) xylyl, and X represents a halogen atom wherein said reaction is carried out in a molar ratio of halogenated derivative of bis-hydroxyethyl terephthalate to halogen containing phosphorus monomer of from about 0.66 to 1 to about 1.5 to 1 and at a temperature of from about 0° to about 100° C and at a pressure of from about 0.1 to about 10 atmospheres.

6. The process of claim 5 wherein said halogenated derivative of bis-hydroxyethyl terephthalate is tetrachloro bis-hydroxyethyl terephthalate and said halogen containing phosphorus monomer is selected from the group consisting essentially of phenyl phosphonyl dichloride and chloromethyl phosphonyl dichloride.

7. The process of claim 6 wherein said reaction is carried out in the presence of a basic solvent.

8. A process for preparing phosphorus and halogen containing polymers useful as flame retardant additives which process comprises reacting tetracholoro bis-hydroxyethyl terephthalate with a halogen containing phosphorus monomer selected from the group consisting essentially of phenyl phosphonyl dichloride and chloromethyl phosphonyl dichloride in a molar ratio of tetrachloro bis-hydroxyethyl terephthalate to halogen containing phosphorus monomer of from about 0.90 to 1 to about 1.1 to 1, in the presence of at least two moles of a tertiary amine per mole of halogen containing phosphorus monomer at a temperature of from about 15° to about 65° C and a pressure of from about 0.8 to about 1.2 atmospheres.

9. A phosphorus and halogen containing polymer of the formula

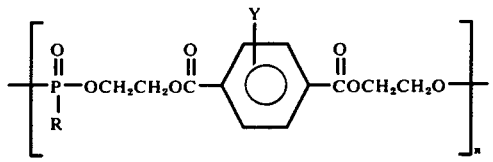

wherein the Y attached to the aromatic ring represents 1 to 4 halogen atoms; the R represents a radical selected from the group consisting of (a) alkyl, (b) bromoalkyl, (c) chloroalkyl, (d) alkylamido and (e) dialkylamido radicals, wherein the alkyl substituents of the foregoing may contain from 1 to 10 carbon atoms, (f) cyclohexyl, (g) phenyl, (h) benzyl, (i) tolyl and (j) xylyl; and n is an integer greater than 1.

10. The phosphorus and halogen containing polymer of claim 9 wherein said polymer contains from about 8 to about 60 percent by weight halogen, and from about 3 to about 10 percent by weight phosphorus, and n is an integer of from about 3 to about 50.

11. The phosphorus and halogen containing polymer of claim 10 wherein Y is selected from the group consisting of chlorine, bromine, and mixtures thereof, and R is selected from the group consisting essentially of phenyl or chloromethyl.

12. A phosphorus and halogen containing polymer of the formula

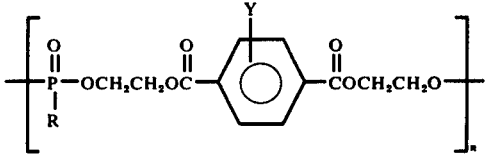

wherein Y represents four chlorine atoms, R is selected from the group consisting essentially of phenyl and chloromethyl, and n is an integer greater than 1.

13. The phosphorus and halogen containing polymer of claim 12 wherein said polymer contains from about 10 to about 40 percent by weight chlorine, and from about 4 to about 9 percent by weight phosphorus, n is an integer of from about 5 to about 10, and wherein said polymer has a weight average molecular weight of from about 500 to about 20,000.

14. A flame retardant composition of matter comprising the phosphorus and halogen containing polymer of claim 9 and an acetate ester of cellulose.

15. The flame retardant composition of claim 14, wherein said composition is either a fiber or a film and said phosphorus and halogen containing polymer is not substantially removed by washing.

16. The flame retardant composition of claim 15 which comprises from about 2 to about 40 percent by weight phosphorus and halogen containing polymer and from about 60 to about 98 percent by weight acetate ester of cellulose.

17. A flame retardant composition of matter comprising the phosphorus and halogen containing polymer of claim 12 and an acetate ester of cellulose.

18. The flame retardant composition of claim 17 which comprises from about 4 to about 20 percent by weight phosphorus and halogen containing polymer and from about 80 to about 96 percent by weight acetate ester of cellulose.

* * * * *